(12) United States Patent
Shimizu et al.

(10) Patent No.: US 9,565,347 B2
(45) Date of Patent: Feb. 7, 2017

(54) IMAGING MODULE AND ELECTRONIC APPARATUS

(71) Applicant: FUJIFILM Corporation, Tokyo (JP)

(72) Inventors: Motokazu Shimizu, Saitama (JP);
Yoshiyuki Takase, Saitama (JP);
Tatsuya Fujinami, Saitama (JP);
Manabu Tobise, Saitama (JP); Masaru Inamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/002,789

(22) Filed: Jan. 21, 2016

(65) Prior Publication Data

US 2016/0142599 A1    May 19, 2016

Related U.S. Application Data

(63) Continuation of application No. PCT/JP2014/068567, filed on Jul. 11, 2014.

(30) Foreign Application Priority Data

Aug. 1, 2013    (JP) .................................. 2013-160622

(51) Int. Cl.
*H04N 5/225*    (2006.01)
*G02B 7/04*    (2006.01)
(Continued)

(52) U.S. Cl.
CPC .............. *H04N 5/2254* (2013.01); *G02B 7/04* (2013.01); *G03B 5/00* (2013.01); *H04N 5/2257* (2013.01);
(Continued)

(58) Field of Classification Search
CPC .................................................. H04N 5/2257
See application file for complete search history.

(56) References Cited

U.S. PATENT DOCUMENTS

2009/0180021 A1    7/2009    Kikuchi et al.
2010/0085474 A1    4/2010    Morita
(Continued)

FOREIGN PATENT DOCUMENTS

JP    2010-21985 A    1/2010
JP    2010-88088 A    4/2010
JP    2013-88525 A    5/2013

OTHER PUBLICATIONS

Written Opinion of the International Searching Authority, issued in PCT/JP2014/068567, dated Oct. 7, 2014.
(Continued)

*Primary Examiner* — Gary C Vieaux
(74) *Attorney, Agent, or Firm* — Birch, Stewart, Kolasch & Birch, LLP

(57) ABSTRACT

The invention provides an imaging module having second connecting portions capable of reliably performing probing and can maintain a small installation space, and an electronic apparatus including the imaging module. A lens unit includes at least one drive unit, a housing, a first connecting portion that is electrically connected to an imaging element unit, a first wiring portion that electrically connects the drive unit to the first connecting portion, a plurality of second connecting portions that are disposed outside the housing, and a second wiring portion that electrically connects the second connecting portions to the drive unit. The second wiring portion includes wires that are electrically connected to the drive unit to which the first wiring portion is connected, and at least a part of the second wiring portion extends to the outside of the housing in a direction in which an element wiring portion extends from the support portion.

20 Claims, 13 Drawing Sheets

(51) Int. Cl.
*G03B 5/00* (2006.01)
*G02B 13/00* (2006.01)
*G02B 7/08* (2006.01)
*G02B 27/64* (2006.01)

(52) U.S. Cl.
CPC ............... *G02B 7/08* (2013.01); *G02B 13/004* (2013.01); *G02B 27/646* (2013.01)

(56) References Cited

U.S. PATENT DOCUMENTS

| | | | | |
|---|---|---|---|---|
| 2016/0134796 A1* | 5/2016 | Kaneko | ................... | G02B 7/02 348/208.11 |
| 2016/0142605 A1* | 5/2016 | Shimizu | ................... | G03B 5/00 348/373 |
| 2016/0323511 A1* | 11/2016 | Takase | ............... | H04N 5/23287 |

OTHER PUBLICATIONS

International Search Report, issued in PCT/JP2014/068567, dated Oct. 7, 2014.

* cited by examiner

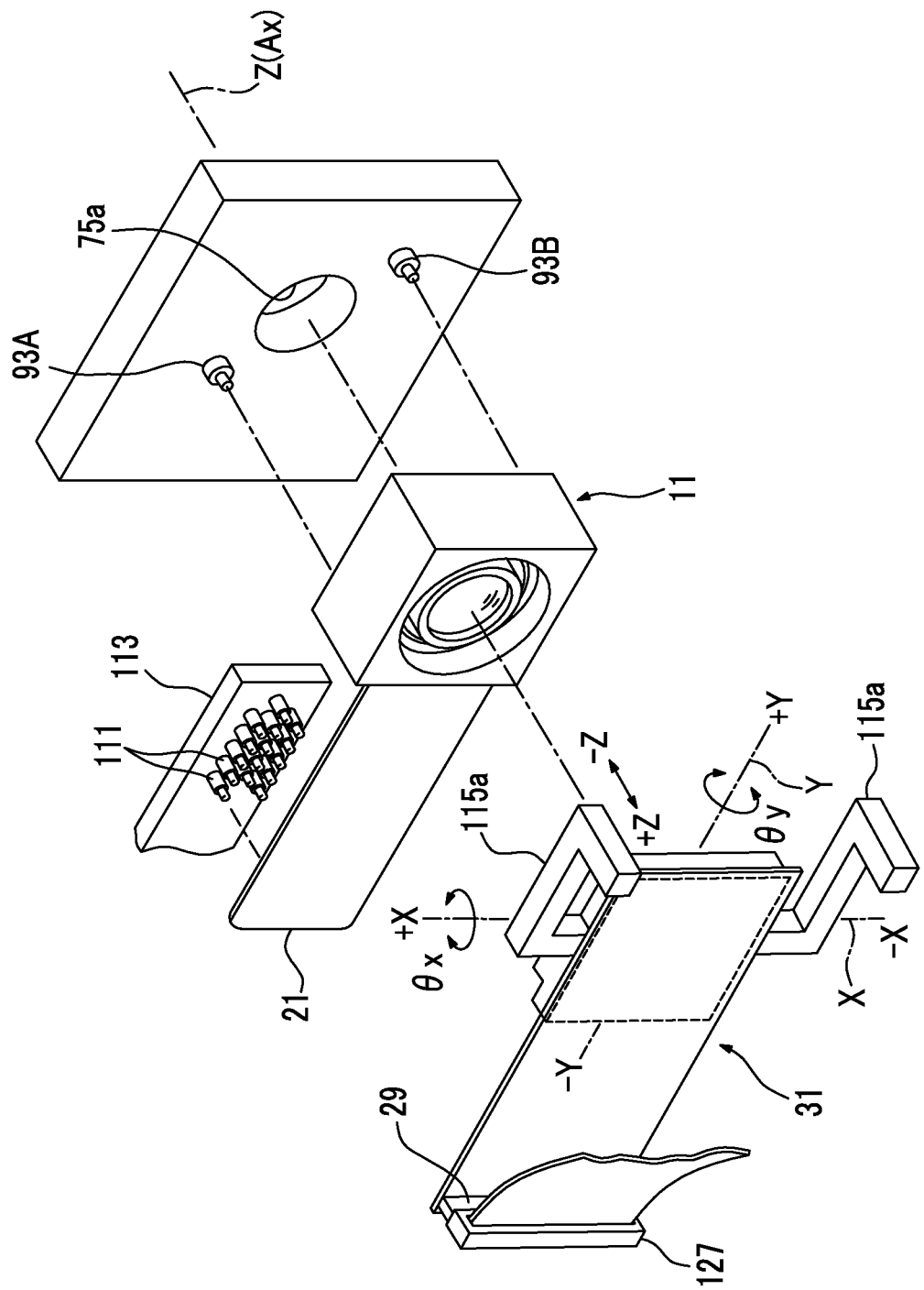

ions. The adjustment terminals are often disposed on the side surface of the imaging module.

Since an imaging element having a small pixel pitch is used in an imaging module of recent years, the size of a lens unit is also reduced to about several mm so as to correspond to the size of the imaging element. For this reason, since it is difficult to increase the area of adjustment terminals, the adjustment terminals need to be aligned with probes, which are to be electrically connected during adjustment, with high accuracy. As a result, an increase in the cost of an apparatus for manufacturing an imaging element unit is caused and manufacturing steps become complicated.

Further, since a space, which houses the imaging module, is limited in the electronic apparatus when the imaging module is assembled in an electronic apparatus, there is often no extra space in the electronic apparatus. For this reason, the outer shape of the imaging module needs to be set so that an installation space for the imaging module is also not increased on a board extending from a housing.

An object of the invention is to provide an imaging module that has connecting portions capable of reliably performing probing with a large area of terminals despite the use of a lens unit reduced in size and can maintain a small installation space when being assembled in an electronic apparatus, and an electronic apparatus including the imaging module.

The invention has the following structure.

(1) An imaging module including:

a lens unit that has a lens group; and an imaging element unit that is fixed to the lens unit and has an imaging element, wherein the imaging element unit includes a support portion that supports the imaging element, an external connection portion that is electrically connected to the outside of the imaging element unit, and an element wiring portion that connects the support portion to the external connection portion, the lens unit includes at least one drive unit that displaces at least a part of a plurality of lenses of the lens group with respect to the imaging element, a housing that houses the drive unit therein, a first connecting portion that is electrically connected to the imaging element unit, a first wiring portion that electrically connects the drive unit to the first connecting portion, a plurality of second connecting portions that are disposed outside the housing, and a second wiring portion that electrically connects the plurality of second connecting portions to the drive unit, the second wiring portion includes wires that are electrically connected to the drive unit to which the first wiring portion is connected, and at least a part of the second wiring portion extends to the outside of the housing in a direction in which the element wiring portion extends from the support portion.

(2) An electronic apparatus including the imaging module.

According to the invention, it is possible to reliably perform probing with a large area of terminals even though a lens unit reduced in size is used. Further, it is possible to maintain a small installation space when the imaging module is assembled in an electronic apparatus.

IMAGING MODULE AND ELECTRONIC APPARATUS

CROSS-REFERENCE TO RELATED APPLICATIONS

Figure 1:
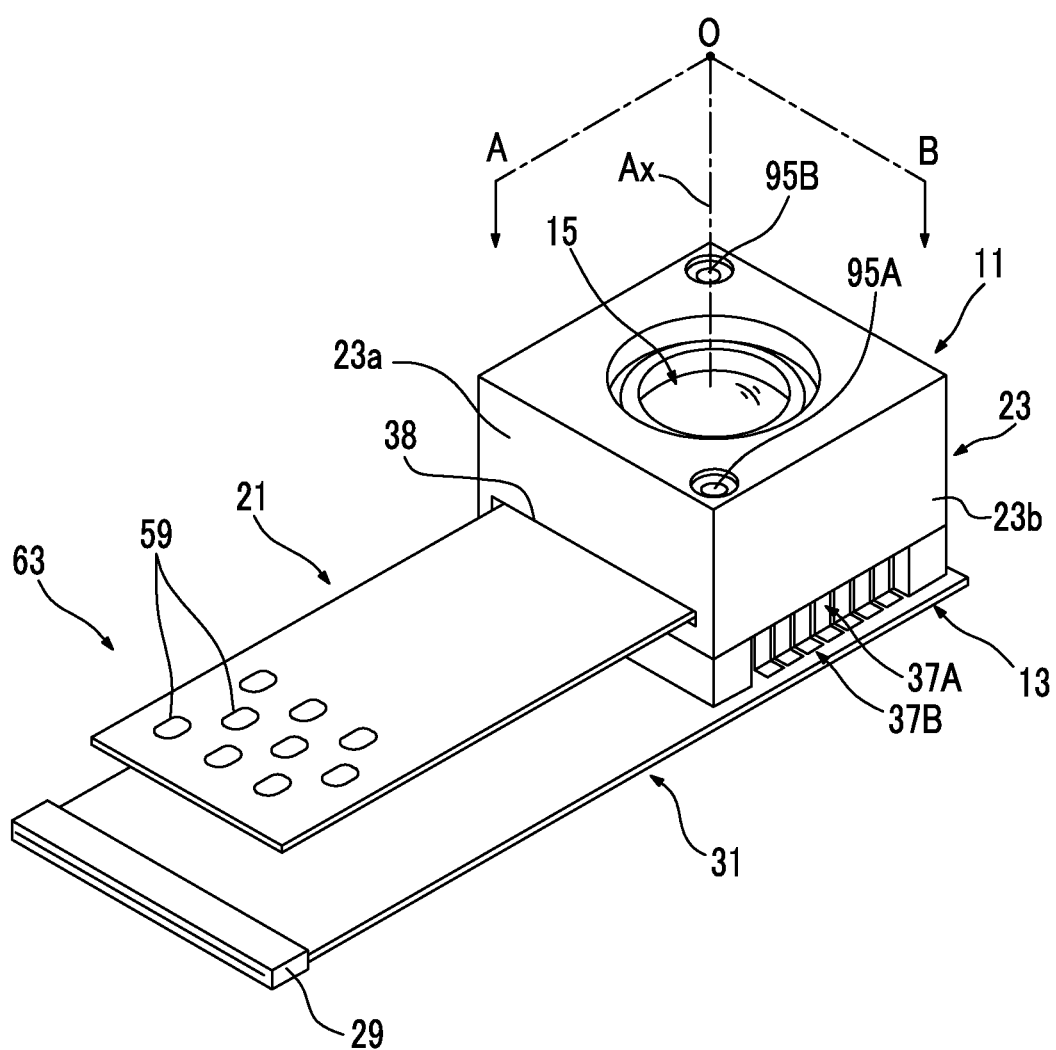
FIG. 1 is a view showing an aspect of an embodiment of the invention and is a perspective view of the appearance of an imaging module.

This application is a Continuation of PCT International Application No. PCT/JP2014/068567 filed on Jul. 11, 2014, which claims priority under 35 U.S.C. §119(a) to Japanese Patent Application No. 2013-160622 filed on Aug. 1, 2013. Each of the above application(s) is hereby expressly incorporated by reference, in its entirety, into the present application.

BACKGROUND OF THE INVENTION

1. Field of the Invention

The present invention relates to an imaging module and an electronic apparatus including an imaging module.

2. Description of the Related Art

A small and thin imaging module is mounted on a portable electronic apparatus such as a mobile phone having an imaging function. The imaging module has a structure in which a lens unit in which imaging lenses are assembled is integrated with an imaging element module in which an imaging element, such as a charge coupled device (CCD) image sensor or a complementary metal-oxide semiconductor (CMOS) image sensor, is assembled (see JP2013-88525A, JP2010-21985A, and JP2010-88088A). In recent years, an imaging element, which has a large number of pixels equal to or larger than 3 to 10 million, has been widely used as an imaging element used in an imaging module, instead of an imaging element that has a small number of pixels of about 1 to 2 million.

When an image pickup element having a small number of pixels is used, particularly high accuracy is not required for the alignment between a lens unit and an image pickup element unit. However, when an image pickup element having a large number of pixels is used, alignment with high accuracy is needed.

JP2010-21985A and JP2010-88088A disclose a technique that automatically aligns the lens unit with an imaging element unit and automatically fixes the imaging element unit to the lens unit. In this technique, an image of a measurement chart is picked up by the imaging element while the lens unit is moved in a direction of an optical axis after the lens unit and the imaging element unit are set to initial positions; and adjustment distances allowing the lens unit and the imaging element unit to correspond to target positions are obtained from the obtained image. The positions of the lens unit and the imaging element unit are adjusted according to the obtained adjustment distances, and the lens unit and the imaging element unit are fixed to each other by adhesion while being aligned with the target positions.

SUMMARY OF THE INVENTION

It is necessary to perform focus adjustment to adjust the positions of the lens unit and the imaging element unit by using picked-up images when aligning the lens unit with the imaging element unit. For this reason, the lens unit includes adjustment terminals, which are used to drive the lenses during adjustment, in order to drive the lenses even when being aligned with the imaging element unit, in addition to connection terminals that are connected to the electronic FIG. 2 is an exploded perspective view of the imaging module shown in FIG. 1.

Figure 2:
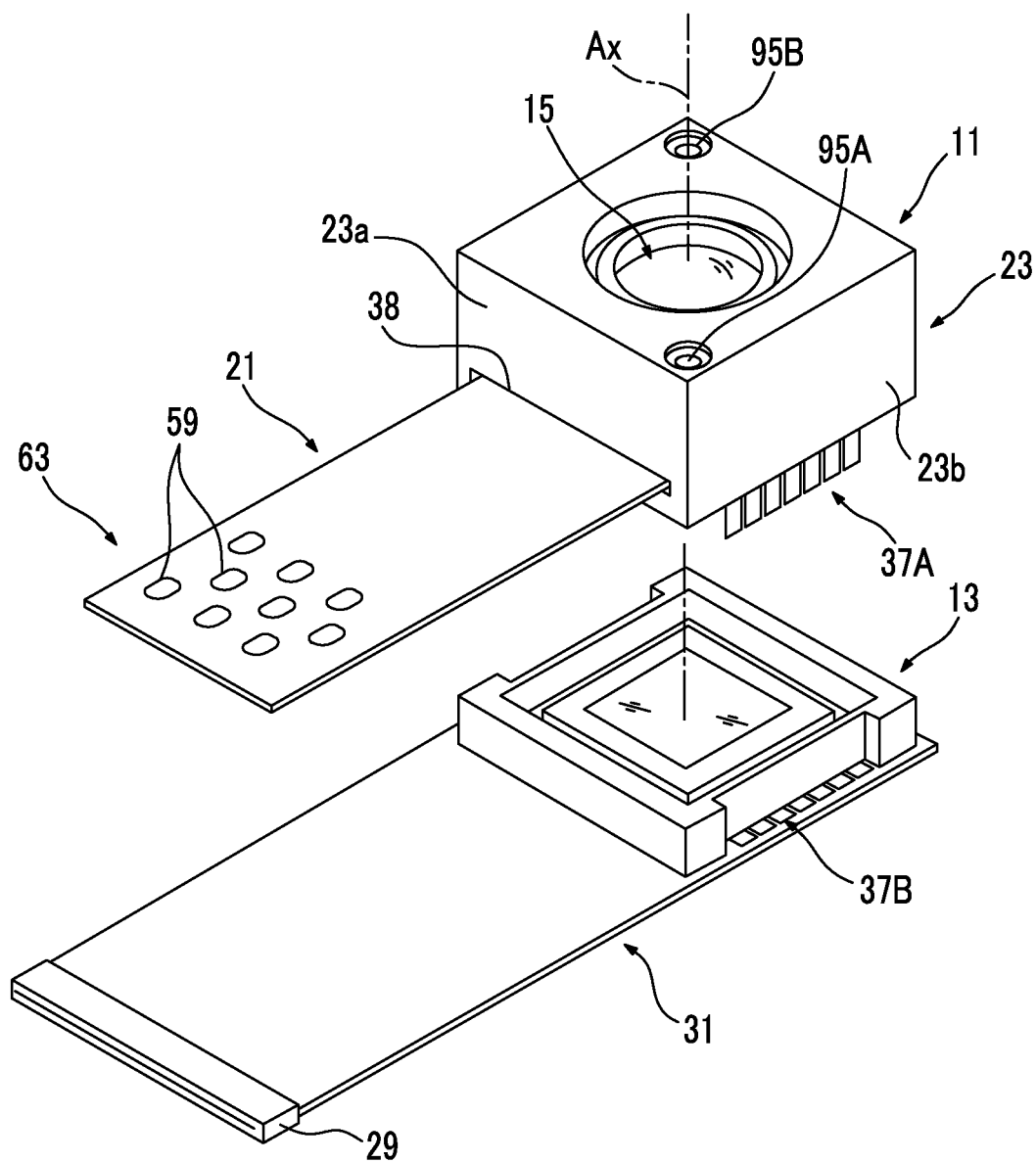
Figure 3:
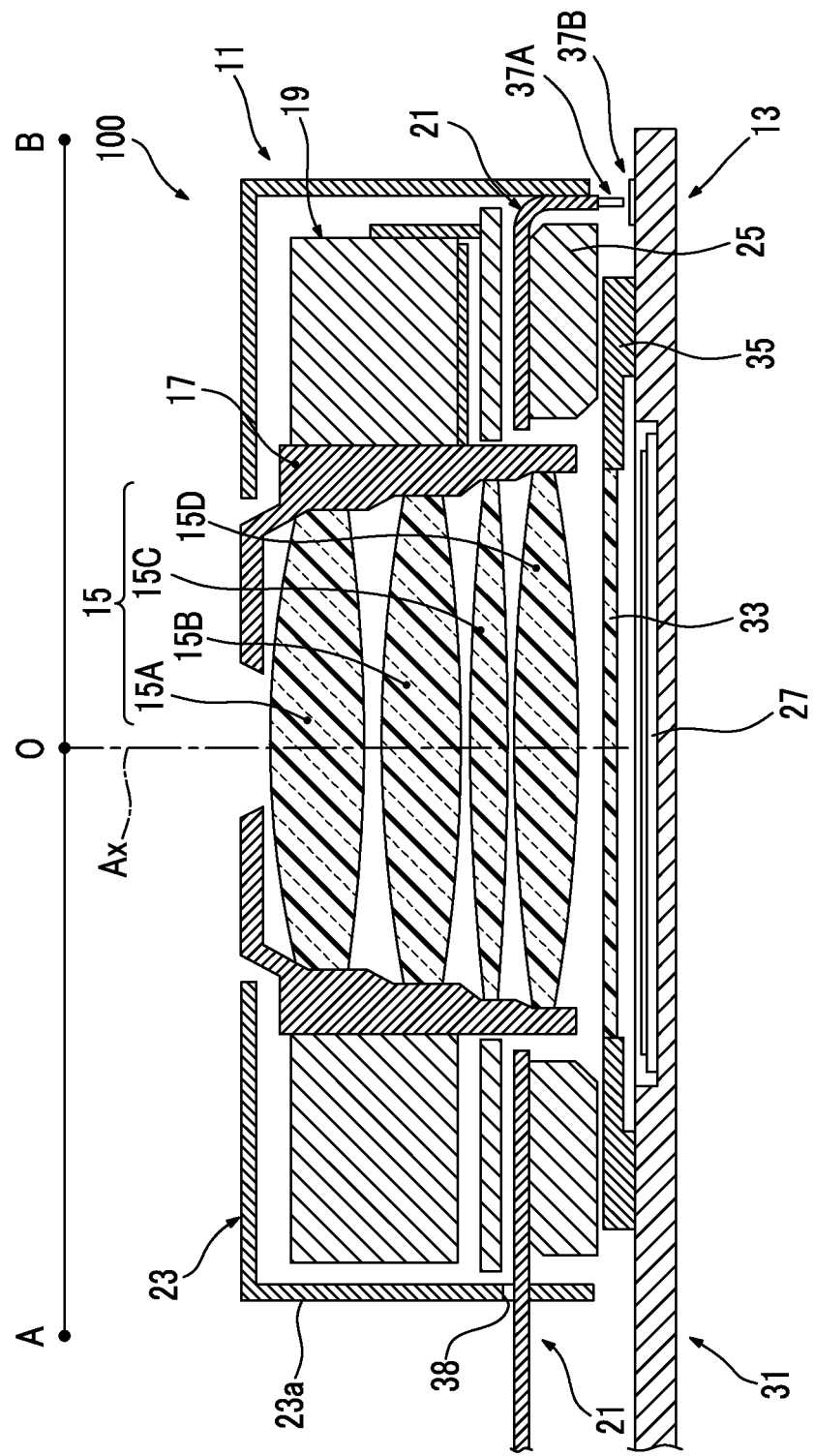

FIG. 3 is a cross-sectional view taken along line A-O-B of FIG. 1.

Figure 4:
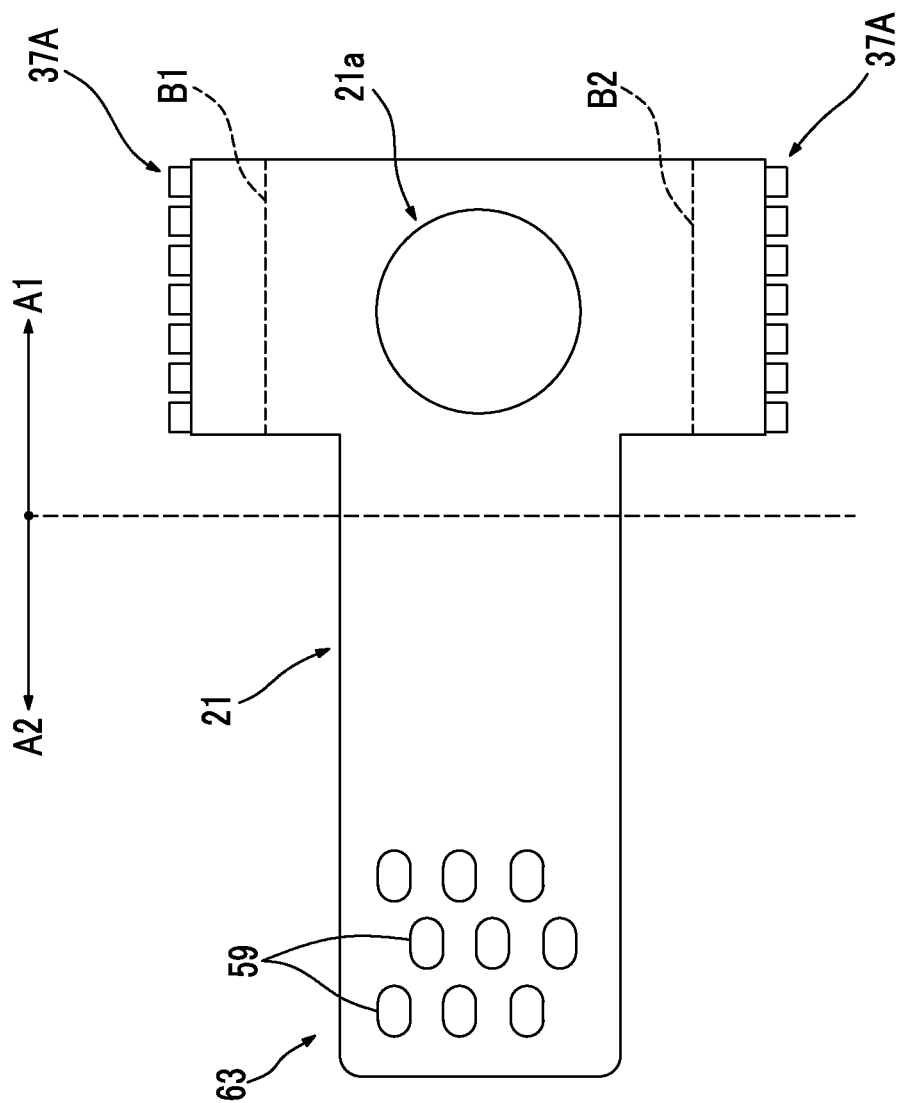

FIG. 4 is a plan view of a flexible printed circuit.

Figure 5:
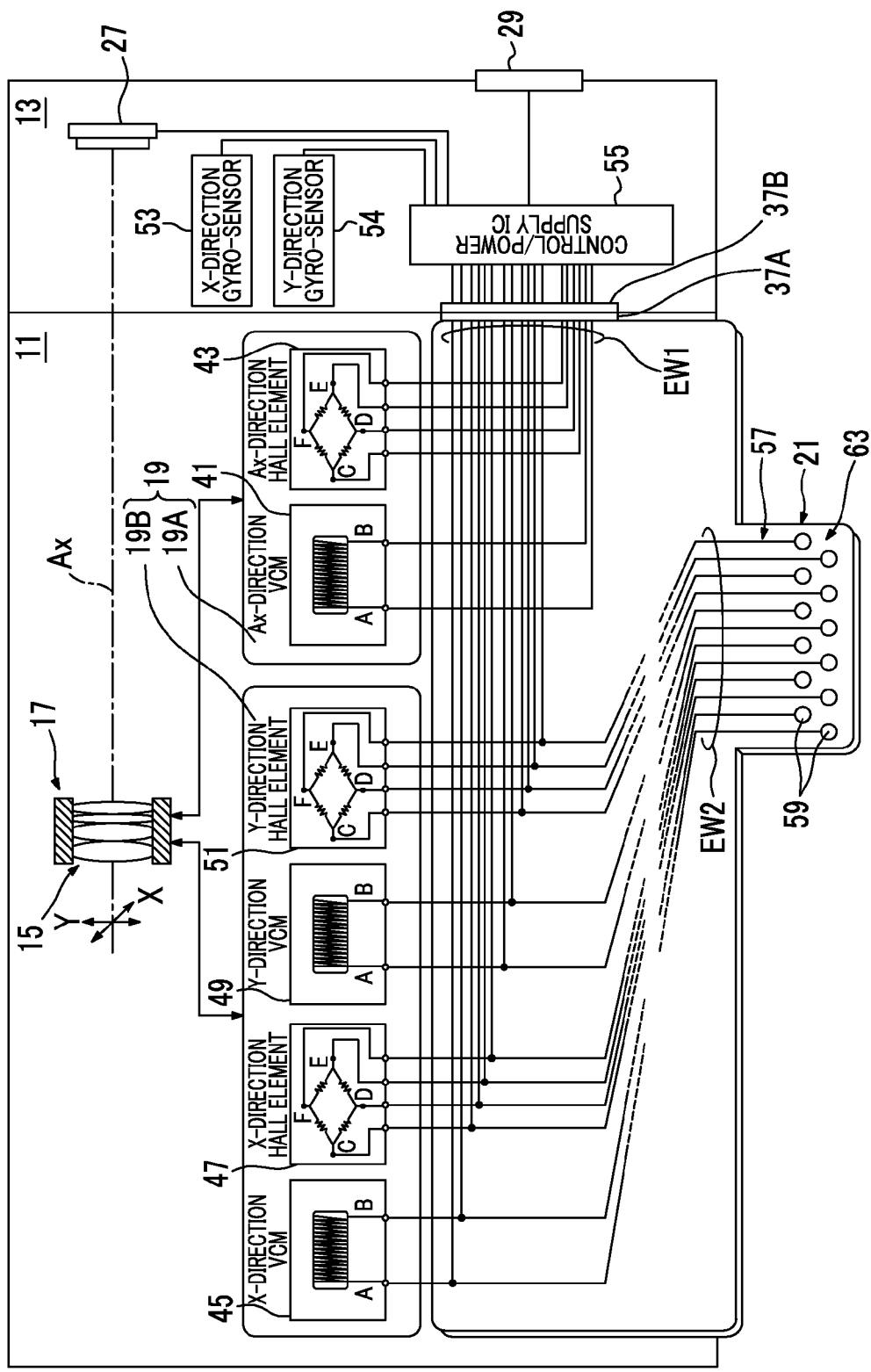

FIG. 5 is a schematic wiring diagram of a lens unit and an imaging element unit.

Figure 6:
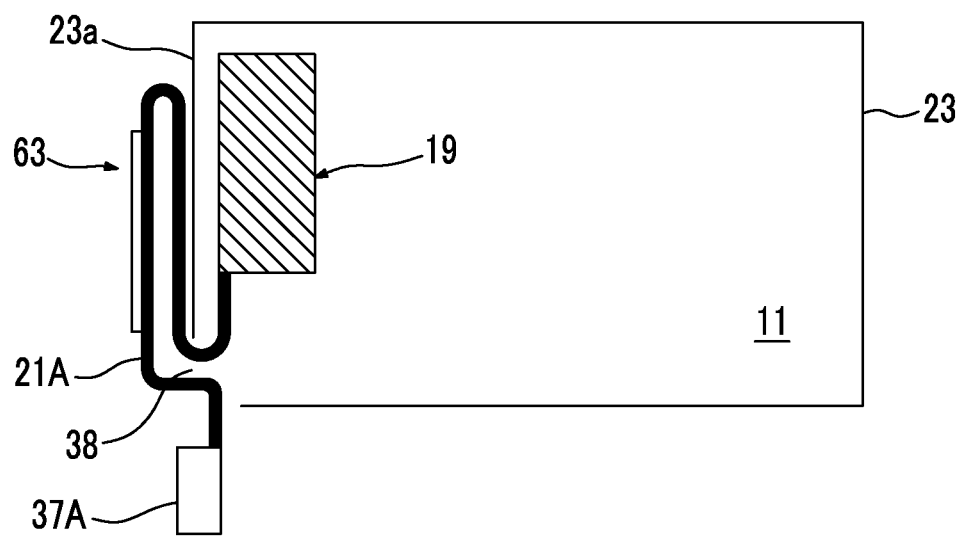

FIG. 6 is a schematic view showing a connection form of a flexible printed circuit.

Figure 7:
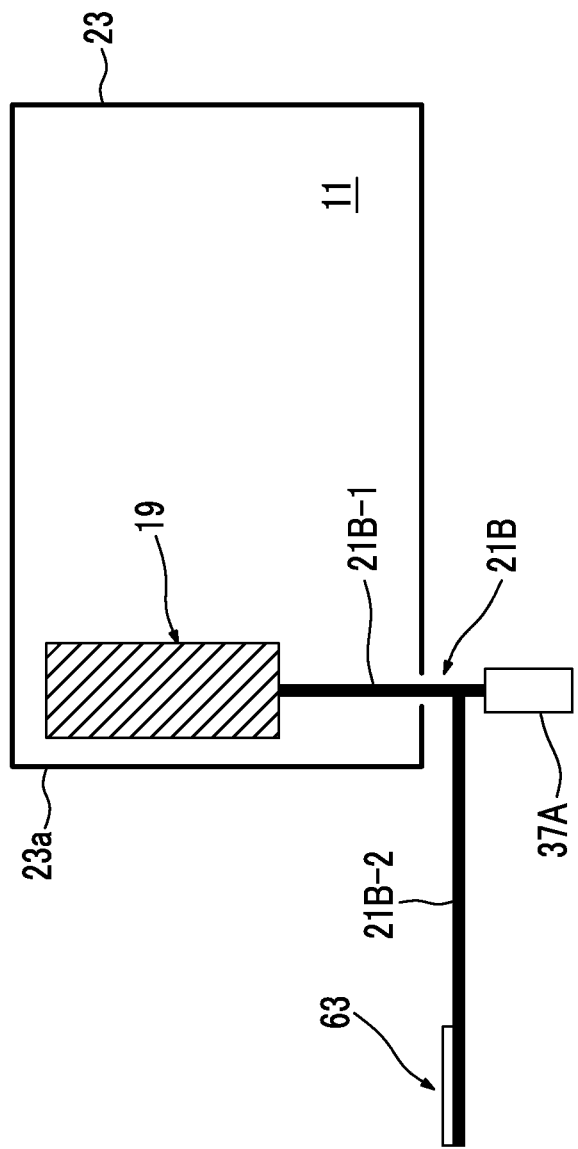

FIG. 7 is a schematic view showing another connection form of a flexible printed circuit.

Figure 8:
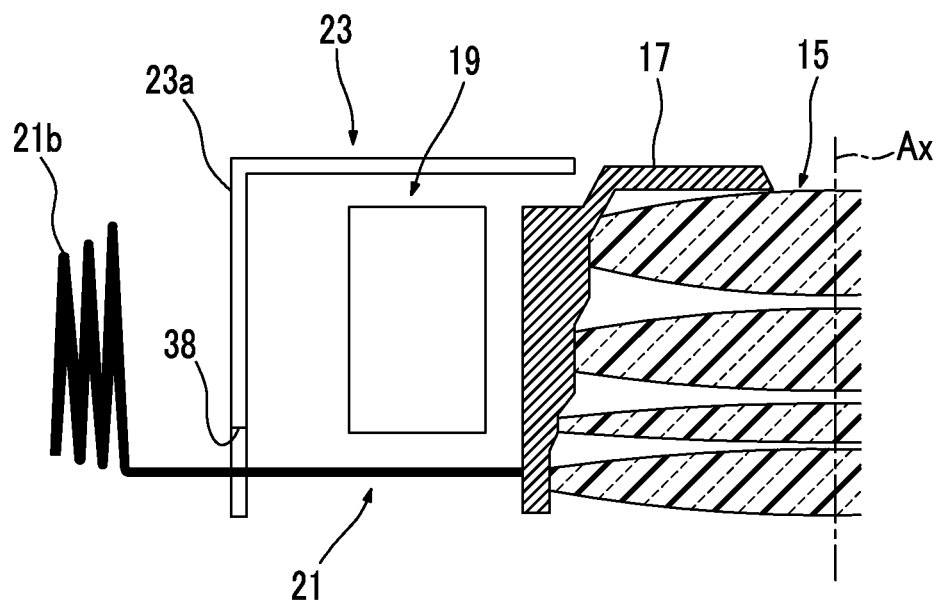

FIG. 8 is a partial cross-sectional view of a lens unit showing a state in which a flexible printed circuit extending from a housing is folded.

Figure 9:
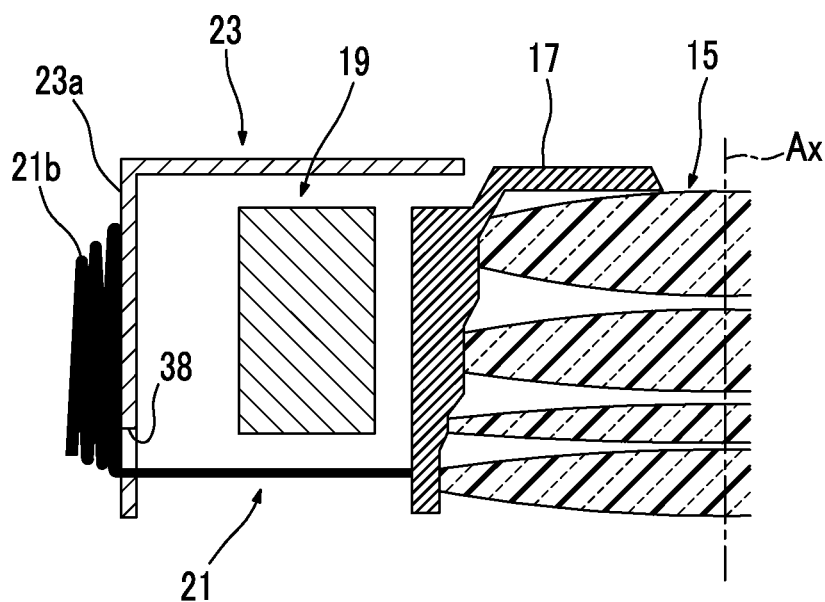

FIG. 9 is a partial cross-sectional view of a lens unit showing a state in which a flexible printed circuit extending from a housing is folded and is fixed to the housing.

Figure 10:
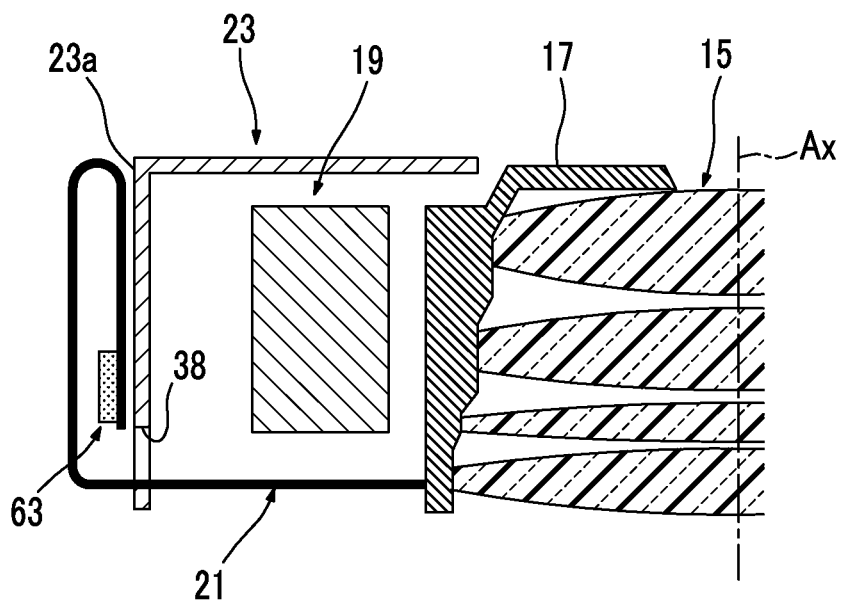

FIG. 10 is a partial cross-sectional view of a lens unit showing a state in which an adjustment terminal portion is folded inside a flexible printed circuit extending from a housing.

Figure 11:
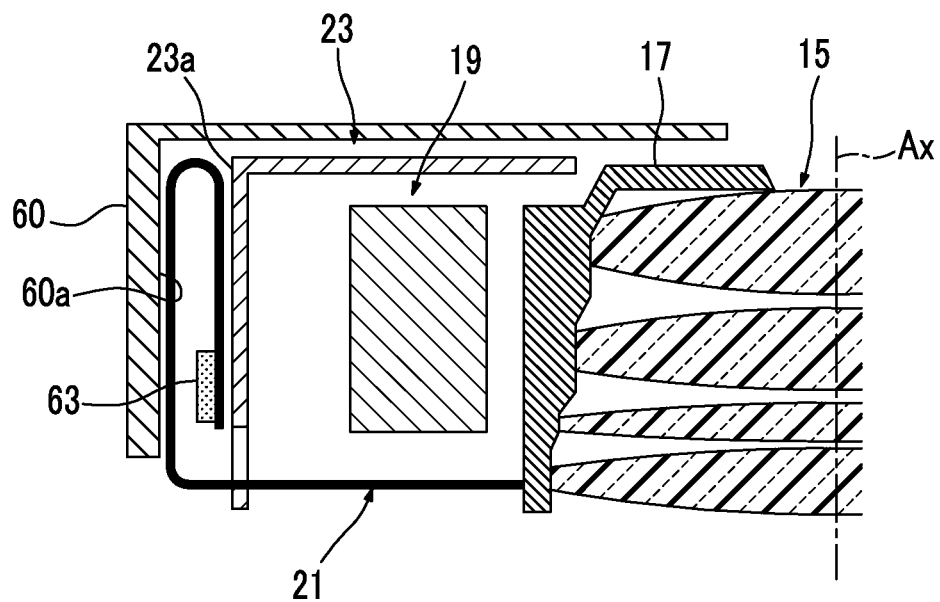

FIG. 11 is a partial cross-sectional view of a lens unit showing a state in which a housing has a double structure and at least a part of a flexible printed circuit is received between a cover member and the housing.

Figure 12:
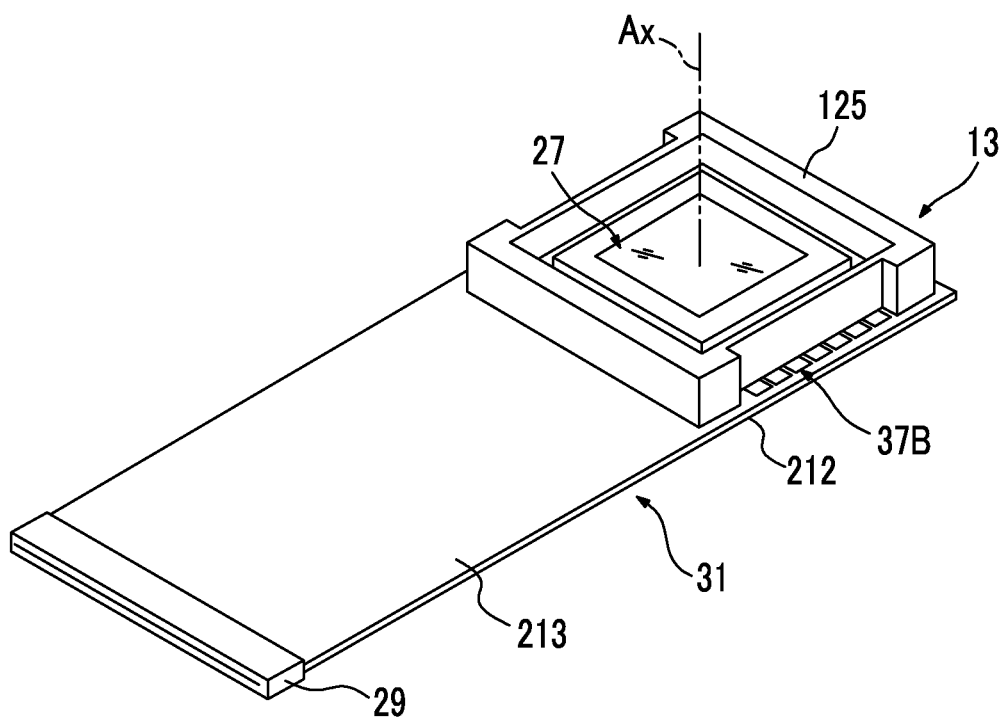

FIG. 12 is a perspective view showing a modification of an element fixing board.

Figure 13A:
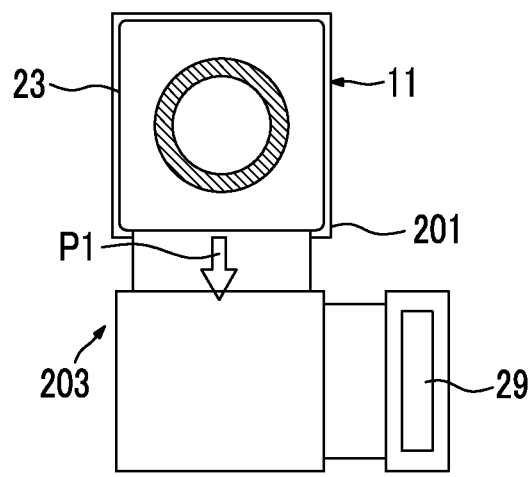
Figure 13B:
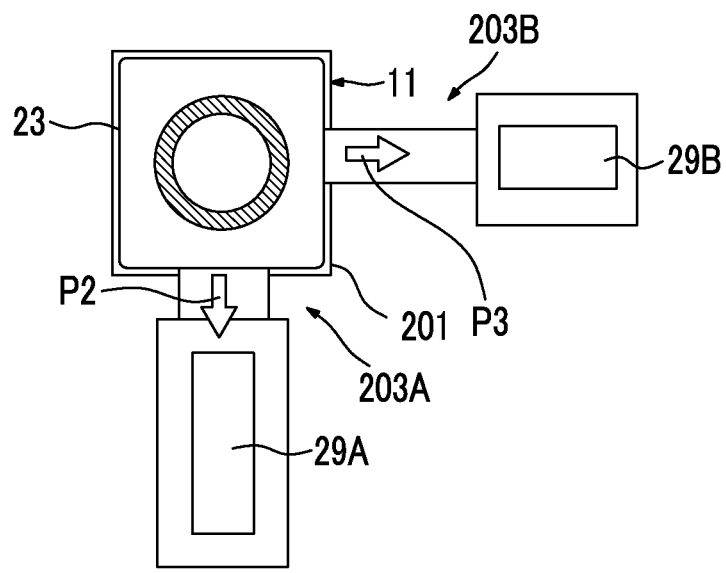

FIGS. 13A and 13B are views showing a relationship between a modification of an element fixing board and an extending direction of a flexible printed circuit.

FIG. 14 is a schematic view showing a part of the structure of an imaging module-manufacturing apparatus.

Figure 15:
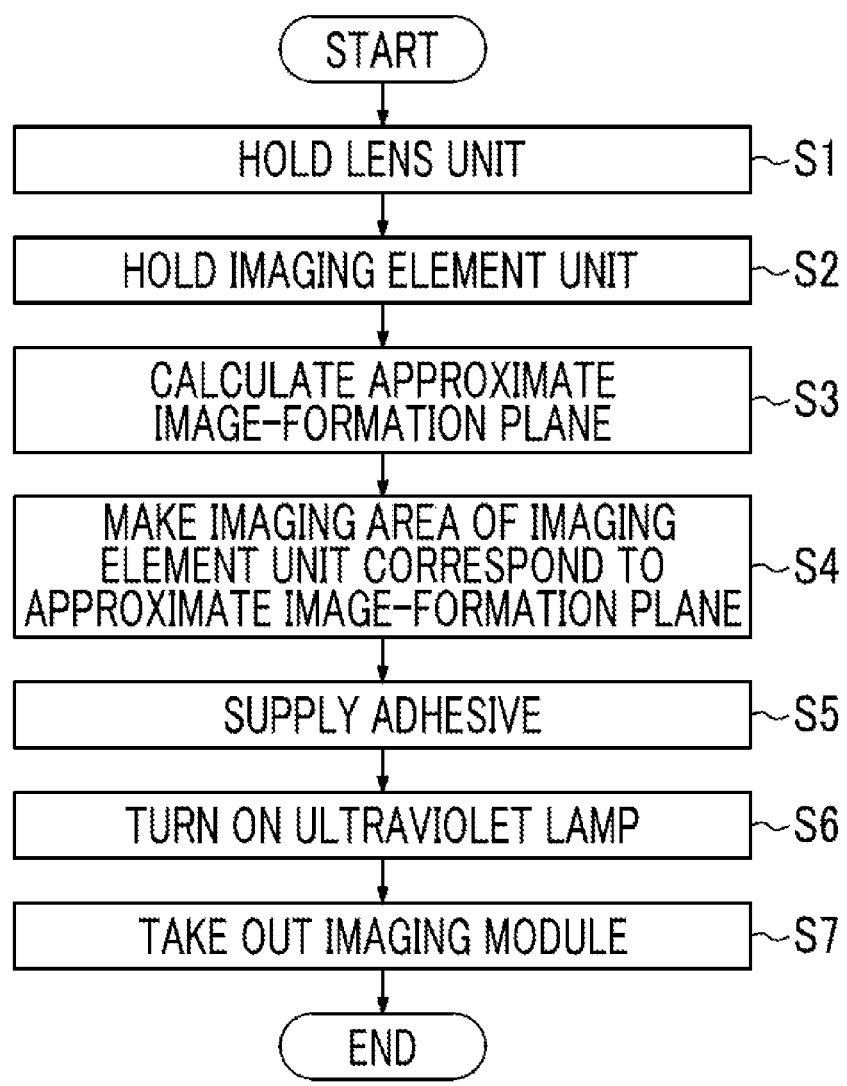

FIG. 15 is a flowchart illustrating steps of manufacturing the imaging module.

DESCRIPTION OF THE PREFERRED EMBODIMENTS

An aspect of an embodiment of the invention will be described in detail below with reference to the drawings.

<Structure of Imaging Module>

FIG. 1 is a view showing an aspect of an embodiment of the invention and is a perspective view of the appearance of an imaging module. FIG. 2 is an exploded perspective view of the imaging module shown in FIG. 1. FIG. 3 is a cross-sectional view taken along line A-O-B of FIG. 1. In the following description of the respective drawings, the same repeated members are denoted by common reference numerals and the description of the members will be omitted or simplified.

As shown in FIGS. 1 and 2, an imaging module 100 has a lens unit 11 and an imaging element unit 13 fixed to the lens unit 11. The lens unit 11 forms an observation image on an imaging element 27, which is included in the imaging element unit 13, by a lens group 15. The imaging element unit 13 outputs image signals of the observation image that is picked up through the lens group 15.

As shown in FIG. 3, the lens unit 11 has the lens group 15 (which is a lens group including lenses 15A, 15B, 15C, and 15D in an example shown in FIG. 3, but is not limited thereto), a lens barrel 17, a lens drive device 19, a flexible printed circuit (FPC) 21, a housing 23, and a bottom block 25. The lens barrel 17 supports the lens group 15 so that the lens group 15 is movable. The housing 23 houses the lens drive device 19 therein and covers the outside of the lens unit 11. The bottom block 25 is disposed on the bottom in the housing 23, and surrounds the outer peripheral portion of the lens barrel 17.

The imaging element unit 13 has the imaging element 27, an element fixing board 31 on which the imaging element 27 is mounted, a sheet of cover glass 33, and a cover holder 35. The element fixing board 31 has an external connection portion 29 that is electrically connected to an external device. The cover holder 35 holds the cover glass 33 and fixes the cover glass 33 to the element fixing board 31.

The imaging element 27 is an imaging element, such as a CCD image sensor or a CMOS image sensor, having a large number of pixels equal to or larger than 3 to 10 million; and a pixel pitch of the imaging element 27 is 1 µm or less. Here, the pixel pitch means the shortest distance among the distances between the centers of photoelectric conversion regions that are included in the pixels of the imaging element 27.

As shown in FIGS. 1 and 2, the element fixing board 31 is a rectangular board, and the imaging element 27 (see FIG. 3) is mounted on one of both end portions of the element fixing board 31 in a longitudinal direction of the element fixing board 31, and the external connection portion 29 is disposed at an end of the other thereof.

The element fixing board 31 includes a support portion, the external connection portion 29, and an element wiring portion (not shown) that are provided on one board. The support portion supports the imaging element 27, the external connection portion 29 is electrically connected to the outside of the imaging element unit 13, and the element wiring portion electrically and physically connects the support portion to the external connection portion 29.

The lens unit 11 and the imaging element unit 13 are separately formed. The positions and postures of the lens unit 11 and the imaging element unit 13 are adjusted using an image, which is picked up through the lens unit 11 by the imaging element 27, so that the image-formation plane of a subject to be imaged by the lens unit 11 corresponds to the imaging area of the imaging element 27 of the imaging element unit 13. When the lens unit 11 and the imaging element unit 13 are fixed to each other by adhesion after the positions and postures of the lens unit 11 and the imaging element unit 13 are adjusted, a product of an imaging module is completed.

The lens unit 11 and the imaging element unit 13 are provided with a unit connecting section 37A (a first connecting portion) and a unit connecting section 37B that are electrically connected to each other when the lens unit 11 and the imaging element unit 13 are fixed to each other, respectively. The unit connecting section 37A is formed of a plurality of comb-shape terminals, and the unit connecting section 37B is formed of a plurality of electrode pads that are disposed so as to correspond to the respective terminals of the unit connecting section 37A. The unit connecting sections 37A and 37B are electrically connected to each other by coming into contact with each other, being soldered to each other, or the like.

The lens drive device 19 has a focus drive unit that adjusts the focus by moving the lens barrel 17, which supports the lens group 15, with respect to the imaging element 27 along a lens axis Ax that is an optical axis of the lens group. Further, the lens drive device 19 has two image blur-correction drive units, which perform image blur-correction driving, such as optical image stabilization, for moving the lens barrel 17 with respect to the imaging element 27 in a direction perpendicular to the lens axis Ax or tilting the lens barrel 17 with respect to the imaging element 27 from a plane orthogonal to the lens axis Ax; and drives the two image blur-correction drive units as necessary.

A drive mechanism of the lens drive device 19 for focus-adjustment driving and image blur-correction driving may be a mechanism that displaces a part of the plurality of lenses 15A to 15D of the lens group 15.

The flexible printed circuit 21 will be described in detail below. The flexible printed circuit 21 is a wiring board that is used to adjust the optical axis of the lens unit 11 and to be electrically connected to an external device including the imaging element unit 13, and is supported by the bottom block 25 provided in the housing 23. Since the flexible printed circuit 21 is used, it is possible to improve the degree of freedom in the routing of wires or the layout of the connection terminals.

The flexible printed circuit 21 has lens driving wires (a first wiring portion) that include a plurality of wires for electrically connecting the unit connecting section 37A to the lens drive device 19. The lens driving wires are wires that are mainly used after the imaging module is formed as a product. Further, the flexible printed circuit 21 has adjustment wires (a second wiring portion) that include a plurality of wires for electrically connecting an adjustment terminal portion (a plurality of second connecting portions) to be described below to the lens drive device 19. The adjustment wires are wires that are electrically connected to all of the drive units of the lens drive device 19 connected to the lens driving wires or at least one drive unit. The lens drive device 19 is connected to two kinds of wires, that is, the lens driving wires connected to the unit connecting section 37A and the adjustment wires, which adjust the lens unit 11 alone, through the flexible printed circuit 21.

A driving signal, which is required to perform focus driving or image blur-correction driving for optical image stabilization, is input to or output from the lens drive device 19 shown in FIG. 3 through the unit connecting section 37A. Further, when the unit connecting sections 37A and 37B are not electrically connected to each other, a driving signal for adjustment can be input to the lens drive device 19 through the adjustment wires from an adjustment terminal portion 63 or can be output from the lens drive device 19 through the adjustment wires.

The adjustment terminal portion 63, which inputs/output the driving signal for adjustment to/from the lens drive device 19, has adjustment terminals 59 that are a plurality of electrical connection terminals. The respective adjustment terminals 59 are provided on a part of the flexible printed circuit 21 extending from the housing 23 of the lens unit 11, and are disposed outside the housing 23. The adjustment terminal portion 63 has a plurality of adjustment terminals 59 that are formed by exposing conductive portions of a part of the wires of the flexible printed circuit 21 to the outside. The plurality of adjustment terminals 59 are arranged on multiple rows at regular intervals. The adjustment terminals 59 of one row are disposed so as to be shifted from those of the adjacent row by a half of the pitch of the adjustment terminals 59, and the adjustment terminals 59 adjacent to each other in a direction of the row are alternately disposed. It is possible to dispose the adjustment terminals with high space efficiency by using the arrangement pattern of the adjustment terminals 59.

When the lens unit 11 and the imaging element unit 13 are fixed to each other, probe pins for adjustment driving, which will be described in detail below, come into contact with the plurality of adjustment terminals 59. Driving signals for adjustment, which are required to perform the focus driving or the image blur-correction driving, are input to or output from the lens drive device 19 through the probe pins. Since this structure is a structure in which the probe pins can simply come into contact with the adjustment terminals 59, a connector does not need to be mounted or removed during adjustment. Accordingly, it is possible to shorten the tact time of manufacturing steps.

Since the adjustment terminal portion 63 is disposed on the flexible printed circuit 21, it is possible to ensure a large area of the terminals without reducing the area of each terminal even though the lens unit requires a plurality of adjustment terminals 59 to drive the lenses by multiaxis control. Accordingly, reliable probing can be performed. Meanwhile, the adjustment terminal portion 63 is coated with an insulating material after the lens unit 11 and the imaging element unit 13 are aligned with each other and fixed to each other. The insulating material may cover the conductive surfaces of at least the adjustment terminals 59. Accordingly, short-circuit of the adjustment terminal portion 63 after the fixing and/or the input of noises to the lens drive device 19 are prevented.

FIG. 4 is a plan view of the flexible printed circuit 21. The flexible printed circuit 21 has a support region A1 that is supported in the housing 23 of the lens unit 11 shown in FIG. 3, and an extending region A2 that extends to the outside of the housing 23.

The flexible printed circuit 21 has a pair of unit connecting sections 37A and 37A that are provided in the support region A1, and is bent at a right angle at the fold lines B1 and B2. Since the flexible printed circuit 21 is bent at the fold lines B1 and B2, the unit connecting sections 37A and 37A are suspended and disposed so as to face the unit connecting section 37B provided on the element fixing board 31 as shown in FIG. 1.

A circular opening portion 21a into which the lens barrel 17 is inserted is formed in the support region A1 of the flexible printed circuit 21.

The adjustment terminal portion 63, which has the plurality of adjustment terminals, is disposed at an end portion of the extending region A2 of the flexible printed circuit 21 opposite to the support region A1.

As shown in FIGS. 1 and 2, a portion, which includes the adjustment terminal portion 63, of the flexible printed circuit 21 extends to the outside from an opening 38 of the housing 23. An extending portion of the flexible printed circuit 21 extends from a side surface 23a, which faces the external connection portion 29, of the housing 23. In other words, the extending portion of the flexible printed circuit 21 extends from the housing 23 in a direction in which the element wiring portion connected to the external connection portion 29 extends from the support portion of the element fixing board 31. Further, the unit connecting sections 37A and 37B are disposed along a side surface 23b of the housing 23 that is adjacent to the side surface 23a.

Due to the above-mentioned structure, the extending portion of the flexible printed circuit 21 is disposed at a position where a projection region of the extending portion of the flexible printed circuit 21, which is obtained when the extending portion of the flexible printed circuit 21 is projected in a direction of the optical axis of the lens group 15, is present within a projection region of the imaging element unit 13 that is obtained when the imaging element unit 13 is projected in the direction of the optical axis of the lens group 15.

For this reason, since the extending portion of the flexible printed circuit 21 does not protrude to the outside of the element fixing board 31, a space in which the imaging module is disposed when the imaging module is assembled in an electronic apparatus can be maintained to be small. Further, even though a lens unit reduced in size is used, probing can be reliably performed with a large area of terminals by the adjustment terminal portion 63 that is disposed on the flexible printed circuit 21.

The lens drive device 19 shown in FIG. 3 moves the lens barrel 17 along the lens axis Ax, so that a focusing operation is performed in the imaging module 100 having the above-mentioned structure. Further, when the lens drive device 19 moves the lens barrel 17 with respect to the imaging element 27 along two axes, which are perpendicular to the lens axis Ax and are orthogonal to each other, (two axes may not be orthogonal to each other and cross each other) or tilts the lens barrel 17 with respect to the imaging element 27 from a plane orthogonal to the lens axis Ax, an image blur correcting operation, such as optical image stabilization, is performed.

Since the imaging module 100 having this structure can simultaneously perform both the focusing operation and the image blur correcting operation or can perform only one of the focusing operation and the image blur correcting operation, the imaging module 100 is adapted to be capable of performing each operation at an arbitrary time as necessary.

Furthermore, the imaging module 100 having this structure uses the imaging element 27 having a pixel pitch of 1 µm. Since the pixel size of an imaging element having a small pixel pitch is small, the light sensitivity of the imaging element having a small pixel pitch deteriorates. For this reason, the imaging element having a small pixel pitch needs to be combined with lenses having a small f-number. Since the depth of focus becomes shallow in this case, a phenomenon in which the resolving power is reduced only in one direction around a screen is likely to occur. Accordingly, high accuracy is required in the assembly of lenses. Particularly, when the pixel pitch of the imaging element is 1 µm or less, there are disadvantages in that it is difficult to adjust the lenses and the man-hours for the manufacturing steps are increased. However, since a large area of the terminals of the adjustment terminal portion 63 can be ensured in the imaging module 100 having this structure, stable probing can be realized. Accordingly, the lens unit 11 and the imaging element unit 13 can be aligned with each other with high accuracy.

Next, the details of the lens drive device 19 of the lens unit 11 and the wires for driving the lens drive device 19 will be described in detail.

FIG. 5 is a schematic wiring diagram of the lens unit 11 and the imaging element unit 13. The aspect of wires shown in FIG. 5 is exemplary, and the wires are not limited thereto. The lens drive device 19 has a focus drive device 19A that performs focus adjustment and an image blur correction-drive device 19B that performs image blur correction. Each of the focus drive device 19A and the image blur correction-drive device 19B uses a voice coil motor (VCM) as a drive unit for driving a lens, and uses a hall element as a sensor for detecting the position of a lens. Meanwhile, the VCM and the hall element are exemplary, and the drive unit for driving a lens and the sensor for detecting the position of a lens may be other devices without being limited thereto.

The focus drive device 19A has an Ax-direction VCM 41 that is a focus drive unit for driving the lens barrel 17 along the lens axis Ax, and an Ax-direction hall element 43 that detects the position of the lens in an Ax direction.

The image blur correction-drive device 19B drives the lens barrel 17 in an X direction (first direction) and a Y direction (second direction) that are orthogonal to each other and are present in a plane perpendicular to the lens axis Ax.

The image blur correction-drive device 19B has an X-direction VCM 45 and an X-direction hall element 47. The X-direction VCM 45 is a first image blur-correction drive unit for driving the lens barrel 17 in the X direction that is a horizontal direction perpendicular to the lens axis Ax, and the X-direction hall element 47 detects the position of the lens in the X direction. The image blur correction-drive device 19B further has a Y-direction VCM 49 and a Y-direction hall element 51. The Y-direction VCM 49 is a second image blur-correction drive unit for driving the lens barrel 17 in the Y direction that is perpendicular to the lens axis Ax and the X direction, and the Y-direction hall element 51 detects the position of the lens in the Y direction. Meanwhile, the image blur correction-drive device 19B may be a drive mechanism that tilts the lens group 15. Since a well-known drive mechanism can be used as the drive mechanism in this case, the description thereof will be omitted.

The lens unit 11 has a first wiring portion EW1 that corresponds to the above-mentioned lens driving wires for electrically connecting the lens drive device 19 to the unit connecting section 37A provided on the lens unit 11, and a second wiring portion EW2 that corresponds to the above-mentioned adjustment wires electrically connected to the lens drive device 19. The first wiring portion EW1 and the second wiring portion EW2 are formed on the flexible printed circuit 21.

A wiring pattern of the flexible printed circuit 21 is formed so that the first wiring portion EW1 mainly connects wires of the lens drive device 19 to the unit connecting section 37A and the second wiring portion EW2 mainly connects the wires of the lens drive device 19 to the respective adjustment terminals 59 of the adjustment terminal portion 63.

The first wiring portion EW1 includes a plurality of wires that are electrically connected to the drive units (the Ax-direction VCM 41, the X-direction VCM 45, and the Y-direction VCM 49) and the sensors (the Ax-direction hall element 43, the X-direction hall element 47, and the Y-direction hall element 51).

The second wiring portion EW2 includes wires that are electrically connected to a drive unit and a sensor corresponding to at least one driving direction among the drive units (the Ax-direction VCM 41, the X-direction VCM 45, and the Y-direction VCM 49) and the sensors (the Ax-direction hall element 43, the X-direction hall element 47, and the Y-direction hall element 51) connected to the first wiring portion EW1.

Accordingly, the second wiring portion EW2 is electrically connected to at least one drive unit, the sensor and the wire that correspond to the drive unit, and a connection portion, which is connected to the drive unit and the sensor, of the unit connecting sections 37A.

Since the wires of the second wiring portion EW2 are connected to the wires of the first wiring portion EW1, the driving of each of the above-mentioned drive units through the first wiring portion EW1 and the acquisition of a detection signal from each of the above-mentioned sensors through the first wiring portion EW1 can be performed in the same manner through the second wiring portion EW2.

Meanwhile, each of the drive units is provided with two contacts (contacts A and B connected to coils) and each of the sensors is provided with four contacts (contacts C, D, E, and F connected to a bridge circuit) in the above-mentioned structure, but the number of the contacts is exemplary and varies according to the type of the drive unit or the sensor. Further, since the number of contacts or wires to be required is increased regardless of the type of the drive unit or the sensor when the lens group 15 is subjected to multiaxis control, a particularly large area in which the adjustment terminals 59 are disposed is required.

The imaging element unit 13 has the imaging element 27, an X-direction gyro sensor 53 that detects an angular velocity in the X direction, a Y-direction gyro sensor 54 that detects an angular velocity in the Y direction, and a control/power supply IC (Integrated Circuit) 55. After the manufacture of the imaging module, the control/power supply IC 55 drives the image blur correction-drive device 19B according to the angular velocities in the respective directions that are detected by the X-direction gyro sensor 53 and the Y-direction gyro sensor 54. Furthermore, the control/power supply IC 55 controls the imaging element 27 so that the imaging element 27 outputs an imaging signal, and controls the supply of power to the entire system.

The first wiring portion EW1 of the lens unit 11 is connected to the control/power supply IC 55 through the unit connecting sections 37A and 37B. The imaging element 27, the X-direction gyro sensor 53, and the Y-direction gyro sensor 54 are connected to the control/power supply IC 55, and the control/power supply IC 55 is connected to the external connection portion 29.

In an example shown in FIG. 6, the second wiring portion EW2 is connected to the X-direction VCM 45, the X-direction hall element 47, the Y-direction VCM 49, and the Y-direction hall element 51 of the image blur correction-drive device 19B. However, when the lens barrel does not need to be driven in the X direction and/or the Y direction, the wires connected to the VCMs and the hall elements corresponding to the driving directions in which the lens barrel does not need to be driven may be omitted.

A driving signal, which drives the focus drive device 19A, and a driving signal, which drives the image blur correction-drive device 19B, are selectively input to the above-mentioned lens unit 11 from the adjustment terminal portion 63 of the flexible printed circuit 21. For this reason, the lens unit 11 can drive the lens drive device 19 of the lens unit 11 through the adjustment terminal portion 63 even in an adjustment state in which the unit connecting section 37A is not electrically connected to the unit connecting section 37B.

A position where the adjustment terminal portion 63 is disposed is not limited to the side surface 23a of the housing 23, and can be appropriately changed according to the disposition of a probe unit. For example, the adjustment terminal portion 63 may be fixed to the same surface as the side surface 23b.

When the lens unit 11 and the imaging element unit 13 are aligned with each other and fixed to each other, the lens drive device 19 is driven using the second wiring portion EW2. The lens drive device 19 drives the lens group 15 according to the driving signal that is input from the second wiring portion EW2. The imaging element unit 13 obtains an image by performing imaging while the lens drive device 19 is driven. An optical image-formation plane formed by the lens unit 11 is calculated on the basis of the obtained image, and the lens unit 11 and the imaging element unit 13 are aligned with each other so that the imaging area of the imaging element 27 corresponds to the optical image-formation plane of a subject image picked up by the lens unit 11.

Then, while the lens unit 11 and the imaging element unit 13 are aligned with each other as shown in FIG. 2, the lens unit 11 and the imaging element unit 13 are fixed to each other by an adhesive. Accordingly, the imaging module 100 shown in FIG. 1 is completed. A series of steps are performed by an imaging module-manufacturing apparatus to be described below.

<Modification of Connection Form of Flexible Printed Circuit>

Next, a modification of a connection form of the flexible printed circuit 21, which has the adjustment terminal portion 63, between the lens drive device 19 and the unit connecting section 37A will be described.

FIG. 6 is a schematic view showing a connection form of the flexible printed circuit. A flexible printed circuit 21A includes at least a part of lens driving wires that electrically connect the lens drive device 19 to the unit connecting section 37A. One of both long end portions of the flexible printed circuit 21A is electrically connected to the lens drive device 19, and the other thereof is provided with the unit connecting section 37A. Further, the flexible printed circuit 21A extends to the outside of the housing from the opening 38 that is formed at the housing 23 of the lens unit 11.

The flexible printed circuit 21A, which extends from the opening 38, is laid along the lens axis on the side surface 23a of the housing 23; is folded back at a position close to the end portion of the side surface 23a; and is laid toward the opening 38 again. Further, an end of the flexible printed circuit 21A is suspended toward the unit connecting section 37A from the bottom of the lens unit 11. Furthermore, an adjustment terminal portion 63 is disposed on the outside of a region of the flexible printed circuit 21A that is laid on the side surface of the housing 23 of the lens unit 11 while overlapping.

In this case, adjustment wires, which electrically connect the lens drive device 19 to the adjustment terminal portion 63, of the flexible printed circuit 21A are also used as at least a part of the lens driving wires that electrically connect the lens drive device 19 to the unit connecting section 37A. For this reason, the lens drive device 19, the adjustment terminal portion 63, and the unit connecting section 37A can be connected to one another on one flexible printed circuit 21A. Accordingly, the configuration of wiring can be simplified.

FIG. 7 is a schematic view showing another connection form of a flexible printed circuit. A flexible printed circuit 21B includes a flexible printed circuit 21B-1 that includes lens driving wires connecting the lens drive device 19 to the unit connecting section 37A, and a flexible printed circuit 21B-2 that is branched from the lens driving wires of the flexible printed circuit 21B-1 and extends to the outside of the housing 23 of the lens unit 11.

An adjustment terminal portion 63 is disposed in a region of the flexible printed circuit 21B-2 that is fixed to the side surface 23a of the housing 23.

In this case, adjustment wires, which are directed to the adjustment terminal portion 63, of the flexible printed circuit 21B are adapted to include a portion that is branched from the lens driving wires directed to the lens drive device 19. Accordingly, the degree of freedom in the layout of each wire is improved.

<Modification of Extension Form of Flexible Printed Circuit Extending to Outside of Housing>

Next, a modification of the extension form of a region, which extends to the outside of the housing 23, of the flexible printed circuit 21 including the adjustment terminal portion 63 will be described.

FIG. 8 is a partial cross-sectional view of a lens unit showing a state in which the flexible printed circuit extending from the housing is folded. The flexible printed circuit 21, which extends to the outside of the housing 23 from the opening 38 of the housing 23, has a folded portion 21b that is formed by folding a part or the entire extending portion of the flexible printed circuit. "Folding", which is mentioned here, means that the flexible printed circuit is bent in a direction different from an extending direction of the flexible printed circuit extending from the housing 23 so as to include at least one bent portion.

The flexible printed circuit 21 has thermoplasticity. Accordingly, when the flexible printed circuit 21 is heated while being folded, the folded shape of the flexible printed circuit 21 is maintained even after the flexible printed circuit 21 is cooled.

Since a portion, which extends to the outside of the housing 23, of the flexible printed circuit 21 is folded, a space, which is occupied outside the housing 23 by the flexible printed circuit 21, can be reduced. Accordingly, the extending portion of the flexible printed circuit 21, which is not necessary after the lens unit 11 and the imaging element unit 13 are fixed to each other, can be compactly disposed without being in the way. Further, since the adjustment terminal portion 63 is interposed and folded inside the flexible printed circuit 21, short-circuit of the adjustment terminal portion 63 can be prevented.

FIG. 9 is a partial cross-sectional view of a lens unit showing a state in which the flexible printed circuit extending from the housing 23 is folded and is fixed to the housing. The entire extending portion, which extends to the outside of the housing 23 from the opening 38 of the housing 23, of the flexible printed circuit 21 is folded. A folded portion 21*b* is fixed to the side surface 23*a* of the housing 23. Various well-known methods, such as fixing using an adhesive and welding using heating, can be employed for the fixing of the extending portion of the flexible printed circuit 21 to the side surface 23*a* of the housing 23.

FIG. 10 is a partial cross-sectional view of a lens unit showing a state in which the adjustment terminal portion 63 is folded inside the flexible printed circuit 21 extending from the housing 23. An extending portion, which extends to the outside of the housing 23 from the opening 38 of the housing 23, of the flexible printed circuit 21 covers the adjustment terminal portion 63 that is formed on a part of the extending portion. Since a surface, on which the plurality of adjustment terminals, of the adjustment terminal portion 63 is disposed inside the bent flexible printed circuit 21, the adjustment terminals are not exposed to the outside of the bent flexible printed circuit 21. That is, the adjustment terminal portion 63 is disposed so as to be interposed between the flexible printed circuit 21 and the side surface 23*a* of the housing 23.

In an example shown in FIG. 10, the flexible printed circuit 21 extending from the opening 38, which is formed at one end of the side surface 23*a* of the housing 23, is led to the other end of the side surface 23*a* of the housing 23 and is folded back at a position close to the other end of the side surface 23*a*. The back of a region, on which the adjustment terminal portion 63 is disposed, of the flexible printed circuit 21 that is folded back is fixed to the side surface 23*a* of the housing 23.

According to this structure, since a surplus extending portion of the flexible printed circuit 21 is used to prevent short-circuit of the adjustment terminal portion 63, an insulating treatment for coating the surface of the adjustment terminal portion 63 with an insulating material can be omitted. Accordingly, steps of manufacturing the imaging module can be simplified.

FIG. 11 is a partial cross-sectional view of a lens unit showing a state in which a housing has a double structure and at least a part of the flexible printed circuit is received between a cover member and the housing. A cover member 60 is mounted on the outside of a housing 23 of the lens unit having this structure shown in FIG. 10. The cover member 60 is a cover that has an opening formed at a position facing the lens group 15 and covers a side of the lens unit 11 on which light is incident, and is fixed to the housing 23. Further, the cover member 60 is disposed so that a gap is formed between an inner peripheral surface 60*a* of the cover member 60 and the side surface 23*a* of the housing 23. At least a part of the extending portion of the flexible printed circuit 21 is received in the gap.

According to this structure, since the extending portion of the flexible printed circuit 21 is received and held in the gap between the cover member 60 and the housing 23, the flexible printed circuit 21 does not interfere with other members. For this reason, the handling ability of the imaging module is improved.

<Modification of Element Fixing Board>

The element fixing board 31 can be formed in various shapes other than the shape of a board on which the imaging element 27 shown in FIGS. 1 and 2 is mounted. FIG. 12 is a perspective view showing a modification of the element fixing board. The element fixing board 31 may be a joined body including a support portion 212 on which the imaging element 27 is mounted, an external connection portion 29 such as a connector, and an element wiring portion 213 such as an anisotropic conductive film (ACF) connecting the support portion 212 to the external connection portion 29. Further, the support portion 212 may be a board where the imaging element 27 is disposed at a cut portion or a notched portion and is integrated.

FIGS. 13A and 13B are schematic plan views of imaging modules showing modifications of the element fixing board. As shown in FIG. 13A, an element fixing board has a support portion 201 that supports an imaging element, an external connection portion 29 that is electrically connected to the outside of an imaging element unit, and an element wiring portion 203 that electrically and physically connects the support portion 201 to the external connection portion 29. In this case, a flexible printed circuit is provided so as to extend from a housing 23 in a direction in which the element wiring portion 203 extends from the support portion 201. That is, the flexible printed circuit may be provided so as to extend in a direction indicated by an arrow P1 of FIG. 13A.

Further, as shown in FIG. 13B, an element fixing board has a support portion 201 that supports an imaging element, external connection portions 29A and 29B that are electrically connected to the outside of an imaging element unit, an element wiring portion 203A that electrically and physically connects the support portion 201 to the external connection portion 29A, and an element wiring portion 203B that electrically and physically connects the support portion 201 to the external connection portion 29B. In this case, a flexible printed circuit may be provided so as to extend in at least one direction of a direction P2 in which the element wiring portion 203A is connected to the support portion 201 and a direction P3 in which the element wiring portion 203B extends from the support portion 201.

Due to the above-mentioned structure, the extending portion of the flexible printed circuit can avoid interfering with peripheral members of the imaging module. Accordingly, the flexible printed circuit can be disposed so that the extending portion is not in the way.

<Manufacture of Imaging Module>

Next, a method of manufacturing the imaging module 100 will be described.

FIG. 14 is a schematic view showing a part of the structure of an imaging module-manufacturing apparatus. When the imaging element unit 13, of which the position and the posture have been adjusted, is fixed to the lens unit 11 after the position and the posture of the imaging element unit 13 with respect to the lens unit 11 are adjusted, the imaging module is obtained.

As shown in FIG. 14, the lens unit 11 is held while being positioned on a lens positioning plate 75, and the imaging element unit 13 is held by a chuck hand 115 so that the posture of the imaging element unit 13 can be freely changed. Then, a probe unit 113 is disposed so as to face the adjustment terminal portion 63 of the flexible printed circuit 21 that extends from the lens unit 11. The probe unit 113 is electrically connected to the above-mentioned lens drive device 19 (see FIG. 5) by allowing probe pins 111 to come into contact with the adjustment terminal portion 63 of the lens unit 11.

Fixing pins 93A and 93B are provided on the lens positioning plate 75 around an opening 75a. The fixing pins 93A and 93B position the lens unit 11 by being inserted into positioning holes 95A and 95B of the lens unit 11 shown in FIG. 1.

The chuck hand 115 has a pair of pinching members 115a that pinch an outer frame 125 of the imaging element unit 13 and are bent substantially in the shape of a crank. These pinching members 115a are connected to drive units (not shown) that adjust the movement of the imaging element unit 13 in a Z-axis direction, the movement of the imaging element unit 13 in two axes directions (an X-axis direction and a Y-axis direction) orthogonal to a Z axis, and the tilts θx and θy of the imaging element unit 13 about an X axis and a Y axis, respectively.

Each part is driven and controlled on the basis of commands from a control unit of the imaging module-manufacturing apparatus.

Next, steps of manufacturing the imaging module will be briefly described with reference to a flowchart of FIG. 15.

First, the fixing pins 93A and 93B of the lens positioning plate 75 are inserted into the positioning holes 95A and 95B of the lens unit 11 and the lens unit 11 is held at a prescribed position on the lens positioning plate 75 (S1). In this case, the probe unit 113 allows the probe pins 111 to come into contact with the adjustment terminal portion 63 of the lens unit Then, the outer frame 125 of the imaging element unit 13 is pinched by the pinching members 115a of the chuck hand 115, so that the imaging element unit 13 is held (S2).

After the lens unit 11 and the imaging element unit 13 are completely held, the control unit calculates an approximate image-formation plane on which a focus point of the lens unit 11 is approximately obtained (S3). The approximate image-formation plane is a plane that is obtained by representing focusing positions of the lens unit 11 as one plane in a three-dimensional coordinate system.

The approximate image-formation plane is approximately obtained in the following manner. First, the lens unit 11 is moved to a plurality of imaging positions that are arranged along a direction of an optical axis (the Z-axis direction), and picks up an image of a measurement chart at each of the imaging positions. An imaging position (Z coordinate) where a focusing degree is highest is obtained at each of a plurality of positions in the screens of the picked-up images (positions in an X-Y plane), from the picked-up images that are obtained in this way and correspond to the respective imaging positions. Then, an approximate plane, which is represented as one plane in the three-dimensional coordinate system having an X axis, a Y axis, and a Z axis when Z coordinates where a focusing degree is highest corresponding to the respective positions in the screens are plotted in an X-Y plane, is calculated. This approximate plane is an approximate image-formation plane, and is expressed by, for example, the expression "aX+bY+cZ+d=0" (a to d are arbitrary constants).

Since the details of a method of calculating the approximate image-formation plane are disclosed in, for example, JP2010-21985A, JP2010-21985A may be referred to as necessary.

Next, the control unit drives the chuck hand 115, which holds the imaging element unit 13, to make the imaging area of the imaging element correspond to the approximate image-formation plane that is obtained as described above (S4). That is, the control unit adjusts the position and the posture of the imaging element unit 13 by changing the positions of the imaging element unit 13 in the X, Y, and Z directions and the rotation angles of θx and θy of the imaging element unit 13 while the imaging element unit 13 is held by the chuck hand 115.

After the control unit aligns the lens unit 11 with the imaging element unit 13 as described above, the control unit supplies an ultraviolet curable adhesive to a gap between the lens unit 11 and the imaging element unit 13 (S5) and turns on an ultraviolet lamp (S6). When the ultraviolet curable adhesive is cured, the lens unit 11 and the imaging element unit 13 are fixed to each other at adjusted positions and postures.

The lens unit 11 and the imaging element unit 13, which are fixed to each other, are detached from the imaging module-manufacturing apparatus (S7), so that the imaging module is completed.

In the imaging module-manufacturing apparatus, the lens axis Ax of the lens unit 11 is set to a vertical direction. In this case, the X-direction VCM 45 and the Y-direction VCM 49 are set in a horizontal plane. For this reason, the X-direction VCM 45 and the Y-direction VCM 49 are hardly affected by gravity, but the Ax-direction VCM 41 is affected by gravity and the lens group 15 is moved down in the vertical direction. Accordingly, while the control unit drives at least the Ax-direction VCM 41 to lift the lens group 15, which is moved down, in the vertical direction, the control unit performs focus adjustment.

When the X-direction VCM 45 and the Y-direction VCM 49 are inclined with respect to the horizontal direction due to a slight error of the set position and are thus affected by gravity, the control unit may drive the X-direction VCM 45 and the Y-direction VCM 49 to remove the influence of gravity. In this case, a more accurate adjustment of the optical axis is performed.

Further, when the X-direction VCM 45 and the Y-direction VCM 49 are not driven and only the Ax-direction VCM 41 is driven, the second wiring portion EW2 can be limited to the wire of at least only a VCM that needs to be driven. That is, it is possible to simplify the structure of the imaging module 100 by minimizing the number of wires of the above-mentioned second wiring portion EW2.

Furthermore, when the imaging module-manufacturing apparatus sets the lens axis of the lens unit 11 to the horizontal direction, the Ax-direction VCM 41 is hardly affected by gravity. However, when the moving direction of the X-direction VCM 45 corresponds to the vertical direction, the X-direction VCM 45 is affected by gravity and the lens group 15 is moved down in the vertical direction. Moreover, when the moving direction of the Y-direction VCM 49 corresponds to the vertical direction, the Y-direction VCM 49 is affected by gravity and the lens group 15 is moved down in the vertical direction. Further, when the moving directions of the X-direction VCM 45 and the Y-direction VCM 49 are directions other than the vertical direction and the horizontal direction, the X-direction VCM 45 and the Y-direction VCM 49 are affected by gravity and the lens group 15 is moved in the vertical direction.

For this reason, the control unit drives all of the VCMs that are affected by gravity to lift the lens group 15, which is moved down, in the vertical direction. In this case, the adjustment of the optical axis is performed with high accuracy without being affected by gravity. Since wires corresponding to VCMs, which do not need to be driven, do not need to be provided, it is possible to simplify the structure of the imaging module by minimizing the number of wires of the second wiring portion EW2.

Particularly, in the above-mentioned case, the imaging module-manufacturing apparatus supports the lens unit 11 and the imaging element unit 13 in the same postures as the postures of the lens unit and the imaging element unit when a user picks up an image by using an imaging module formed as a product. That is, the lens axis of the lens unit 11 is parallel to the Z axis and the driving direction of the lens barrel driven by the X-direction VCM is parallel to the horizontal direction. In this case, the Ax-direction VCM and the X-direction VCM are not affected by gravity and only the Y-direction VCM is affected by gravity. Accordingly, since the movement of the lenses performed by each drive unit during adjustment is subjected to the same influence as the influence of gravity that is applied during the use of a product, more highly accurate adjustment can be performed.

Meanwhile, the imaging module-manufacturing apparatus and the method of manufacturing the imaging module are exemplary, and the lens unit 11 and the imaging element unit 13 may be fixed to each other by other apparatuses and other manufacturing methods.

The above-mentioned imaging module is supported by a support member, such as a board (not shown), and is disposed in a housing of an electronic apparatus, such as a digital camera or an in-vehicle camera, and is provided as an imaging device. Examples of an object in which the imaging module is assembled include electronic apparatuses, such as a camera for a PC built into a PC (Personal Computer) or provided outside a PC, an interphone with a camera, and a portable terminal device having an imaging function, other than the above-mentioned electronic apparatus. Examples of the portable terminal device include a mobile phone, a smartphone, a PDA (Personal Digital Assistants), a portable game machine, a wristwatch-type terminal, and a glass-type terminal that is worn on the head and has displays provided on lenses of the glasses.

The invention is not limited to the above-mentioned embodiment. Modifications and applications, which are made by those skilled in the art on the basis of the combinations of the respective components of the embodiment, the description of this specification, and well-known techniques, are also planned from the invention and are included in the claims to be protected.

As described above, this specification discloses the following.

(1) An imaging module including:
a lens unit that has a lens group; and
an imaging element unit that is fixed to the lens unit and has an imaging element,
wherein the imaging element unit includes a support portion that supports the imaging element, an external connection portion that is electrically connected to the outside of the imaging element unit, and an element wiring portion that connects the support portion to the external connection portion,
the lens unit includes at least one drive unit that displaces at least a part of a plurality of lenses of the lens group with respect to the imaging element, a housing that houses the drive unit therein, a first connecting portion that is electrically connected to the imaging element unit, a first wiring portion that electrically connects the drive unit to the first connecting portion, a plurality of second connecting portions that are disposed outside the housing, and a second wiring portion that electrically connects the plurality of second connecting portions to the drive unit,
the second wiring portion includes wires that are electrically connected to the drive unit to which the first wiring portion is connected, and
at least a part of the second wiring portion extends to the outside of the housing in a direction in which the element wiring portion extends from the support portion.

(2) The imaging module according to (1),
wherein the second wiring portion includes wires that are electrically connected to all the drive units of at least one drive unit, respectively.

(3) The imaging module according to (1) or (2), further including:
sensors that detect the displacement of the lenses,
wherein the first wiring portion includes wires that electrically connect the sensors to the first connecting portion, and
the second wiring portion includes wires that electrically connect the plurality of second connecting portions to the sensors and wires that are electrically connected to the sensors to which the first wiring portion is connected.

(4) The imaging module according to any one of (1) to (3),
wherein the second connecting portions are formed by exposing conductive portions of a part of the wires included in the second wiring portion.

(5) The imaging module according to any one of (1) to (4),
wherein the drive unit includes a focus drive unit that drives at least a part of the lenses, a first image blur-correction drive unit that drives at least a part of the lenses in a first direction present in a plane perpendicular to a direction of an optical axis of the lens group, and a second image blur-correction drive unit that drives at least a part of the lenses in a second direction crossing the first direction present in the plane perpendicular to the direction of the optical axis of the lens group.

(6) The imaging module according to any one of (1) to (5),
wherein the second connecting portions are coated with an insulating material.

(7) The imaging module according to any one of (1) to (6),
wherein the second wiring portion is disposed at a position where a projection region of the second wiring portion, which is obtained when the second wiring portion is projected in the direction of the optical axis of the lens group, is present within a projection region of the imaging element unit that is obtained when the imaging element unit is projected in the direction of the optical axis.

(8) The imaging module according to any one of (1) to (7),
wherein the second wiring portion is used as at least a part of the first wiring portion.

(9) The imaging module according to any one of (1) to (7),
wherein the second wiring portion includes a portion branched from the first wiring portion.

(10) The imaging module according to any one of (1) to (9), wherein the second wiring portion includes a flexible printed circuit.

(11) The imaging module according to (10),
wherein at least a part of a portion, which extends to the outside of the housing, of the flexible printed circuit is folded.

(12) The imaging module according to (10) or (11),
wherein at least a part of a portion, which extends to the outside of the housing, of the flexible printed circuit is fixed to a side surface of the housing.

(13) The imaging module according to (10) or (11),
wherein the second connecting portions are disposed inside a portion, which extends to the outside of the housing and is bent, of the flexible printed circuit.

(14) The imaging module according to any one of (10) to (13), further including:
a cover member that covers at least a part of the outside of the housing,
wherein at least a part of a portion, which extends to the outside of the housing, of the flexible printed circuit is received in a gap between the cover member and the housing.

(15) The imaging module according to any one of (1) to (14),
wherein a pixel pitch of the imaging element is 1 μm or less.

(16) An electronic apparatus including the imaging module according to any one of (1) to (15).

EXPLANATION OF REFERENCES

11: lens unit
13: imaging element unit
15A, 15B, 15C, 15D: lens
19: lens drive device
19A: focus drive device
19B: image blur correction-drive device
21: flexible printed circuit
23: housing
23a: side surface
27: imaging element
29: external connection portion
31: element fixing board
37A: unit connecting section (first connecting portion)
37B: unit connecting section
38: opening
59: adjustment terminal (second connecting portion)
63: adjustment terminal portion
100: imaging module
200: imaging module-manufacturing apparatus
203, 203A, 203B: element wiring portion
Ax: lens axis
EW1: first wiring portion
EW2: second wiring portion

What is claimed is:

1. An imaging module comprising:
a lens unit that has a lens group; and
an imaging element unit that is fixed to the lens unit and has an imaging element,
wherein the imaging element unit includes a support portion that supports the imaging element, an external connection portion that is electrically connected to the outside of the imaging element unit, and an element wiring portion that connects the support portion to the external connection portion,
the lens unit includes at least one drive unit that displaces at least a part of a plurality of lenses of the lens group with respect to the imaging element, a housing that houses the drive unit therein, a first connecting portion that is electrically connected to the imaging element unit, a first wiring portion that electrically connects the drive unit to the first connecting portion, a plurality of second connecting portions that are disposed outside the housing, and a second wiring portion that electrically connects the plurality of second connecting portions to the drive unit,
the second wiring portion includes wires that are electrically connected to the drive unit to which the first wiring portion is connected, and
at least a part of the second wiring portion extends to the outside of the housing in a direction in which the element wiring portion extends from the support portion.

2. The imaging module according to claim 1,
wherein the second wiring portion includes wires that are electrically connected to all the drive units of at least one drive unit, respectively.

3. The imaging module according to claim 1, further comprising:
sensors that detect the displacement of the lenses,
wherein the first wiring portion includes wires that electrically connect the sensors to the first connecting portion, and
the second wiring portion includes wires that electrically connect the plurality of second connecting portions to the sensors and wires that are electrically connected to the sensors to which the first wiring portion is connected.

4. The imaging module according to claim 2, further comprising:
sensors that detect the displacement of the lenses,
wherein the first wiring portion includes wires that electrically connect the sensors to the first connecting portion, and
the second wiring portion includes wires that electrically connect the plurality of second connecting portions to the sensors and wires that are electrically connected to the sensors to which the first wiring portion is connected.

5. The imaging module according to claim 1,
wherein the second connecting portions are formed by exposing conductive portions of a part of the wires included in the second wiring portion.

6. The imaging module according to claim 2,
wherein the second connecting portions are formed by exposing conductive portions of a part of the wires included in the second wiring portion.

7. The imaging module according to claim 3,
wherein the second connecting portions are formed by exposing conductive portions of a part of the wires included in the second wiring portion.

8. The imaging module according to claim 4,
wherein the second connecting portions are formed by exposing conductive portions of a part of the wires included in the second wiring portion.

9. The imaging module according to claim 1,
wherein the drive unit includes a focus drive unit that drives at least a part of the lenses, a first image blur-correction drive unit that drives at least a part of the lenses in a first direction present in a plane perpendicular to a direction of an optical axis of the lens group, and a second image blur-correction drive unit that drives at least a part of the lenses in a second direction crossing the first direction present in the plane perpendicular to the direction of the optical axis of the lens group.

10. The imaging module according to claim 1,
wherein the second connecting portions are coated with an insulating material.

11. The imaging module according to claim 1,
wherein the second wiring portion is disposed at a position where a projection region of the second wiring portion, which is obtained when the second wiring portion is projected in the direction of the optical axis of the lens group, is present within a projection region of the imaging element unit that is obtained when the imaging element unit is projected in the direction of the optical axis.

12. The imaging module according to claim 1,
wherein the second wiring portion is used as at least a part of the first wiring portion.

13. The imaging module according to claim 1,
wherein the second wiring portion includes a portion branched from the first wiring portion.

14. The imaging module according to claim 1,
wherein the second wiring portion includes a flexible printed circuit.

15. The imaging module according to claim 14,
wherein at least a part of a portion, which extends to the outside of the housing, of the flexible printed circuit is folded.

16. The imaging module according to claim 14,
wherein at least a part of a portion, which extends to the outside of the housing, of the flexible printed circuit is fixed to a side surface of the housing.

17. The imaging module according to claim 14,
wherein the second connecting portions are disposed inside a portion, which extends to the outside of the housing and is bent, of the flexible printed circuit.

18. The imaging module according to claim 14, further comprising:
a cover member that covers at least a part of the outside of the housing,
wherein at least a part of a portion, which extends to the outside of the housing, of the flexible printed circuit is received in a gap between the cover member and the housing.

19. The imaging module according to claim 1,
wherein a pixel pitch of the imaging element is 1 µm or less.

20. An electronic apparatus including the imaging module according to claim 1.

* * * * *